United States Patent Office
3,054,787
Patented Sept. 18, 1962

3,054,787
CATALYTIC PROCESS
Gaetano F. D'Alelio, South Bend, Ind., assignor, by direct and mesne assignments, to Dal Mon Research Co., Cleveland, Ohio, a corporation of Delaware
No Drawing. Filed Mar. 17, 1958, Ser. No. 721,653
28 Claims. (Cl. 260—93.5)

This invention relates generally to new catalysts. More particularly it concerns catalysts useful in the treatment or processing of olefins. Specifically, this invention deals with the polymerization of olefins such as ethylene, propylene, butene-1, styrene, butadiene, isoprene and the like with a catalyst comprising the reaction product of a mixture consisting essentially of magnesium and an aluminum halide, specifically aluminum chloride. Preferably, the polymerization is performed in an inert medium.

It is known that aluminum chloride and other Friedel-Crafts type catalysts are capable of converting ethylene to oily low-molecular weight products but not to high molecular weight solid polymers. Also it has been known that solid high molecular weight polyethylene can be prepared by using a catalyst prepared by reacting a titanium halide, such as titanium tetrachloride with an alkyl aluminum. For some time, it has also been known that a mixture of solid polymers and liquid polymers of ethylene may be obtained by polymerizing ethylene in the presence of a mixture of titanium chloride, aluminum chloride at high pressures and elevated temperatures in the presence of metals, such as aluminum, which binds hydrogen chloride released from the titanium tetrachloride. In this system, the aluminum chloride is of little or no value since solid, high molecular weight polymers are obtained exclusively when the aluminum chloride is omitted in the procedure. The addition of any amount of aluminum chloride results in the production of oily polymers along with the solid polymer, and increased amounts of aluminum chloride results in increased quantities of oily polymers.

It is surprising, therefore, and totally unexpected, that high yields of solid, high molecular weight polyethylene can be obtained from a catalyst prepared by reacting magnesium and an aluminum halide, for example, aluminum chloride. The reaction between the magnesium and the aluminum chloride can be effected in numerous ways. Preferably the magnesium should be in a finely divided form and mixed with finely divided aluminum chloride. The mixture then can be ground together in a ball mill at room temperature or at temperatures above room temperature up to 400° C. or higher, to produce an active catalyst. Alternately, the intimate stationary mixture of magnesium and aluminum chloride may be heated together at temperatures between 100° C. and 300–400° C., or even higher, to produce an activated aluminum halide catalyst suitable for the polymerization of olefins. The catalytic activity of the reaction product obtained by heating a stationary mixture of the magnesium and aluminum chloride may be increased further by ball milling the product. Instead of aluminum chloride, an aluminum halide such as aluminum fluoride, bromide or iodide may also be used. A preferred embodiment of the invention is to grind or ball mill and heat the components simultaneously at temperatures above 50° C. and preferably at temperatures from 200–500° C. The catalyst of this invention are extremely reactive and sensitive to contaminants such as moisture, oxygen, and the like, and therefore should be processed under inert conditions such as in the presence of nitrogen, or the noble gases such as helium, neon, argon, etc. They are also very active reducing agents and easily oxidized.

The grinding and milling operation may be performed as a dry operation in the absence of an inert liquid medium. Sometimes it is more convenient to wet-grind the mixture of magnesium and aluminum chloride by adding an inert medium, such as a hydrocarbon, to the mixture to be ball milled. The hydrocarbon, if used, is preferably one that will not interefere with the subsequent polymerization reaction and is preferably the same hydrocarbon used in the polymerization. Also, the milling can be carried out partly by dry-grinding in an inert atmosphere and then an inert hydrocarbon can be added to the mill toward the end of the milling in order to slurry the product for ease of handling.

The nature of the catalysts of this invention is unknown but they appear to be compounds that contain reactive and unstable magnesium to aluminum bonds behaving as if it were $Cl_2Al \cdot MgCl$. I do not wish to be bound by this theory because of the complex nature of the reaction but it may be readily observed that a reaction does occur between aluminum chloride and magnesium, and the magnesium which does react during the reaction loses its identity as magnesium metal.

The magnesium used in the practice of this invention may be in any convenient form; it may be in the form of foil, wire, powder, granules, etc. It is not necessary that the aluminum be chemically pure. Technical grade magnesium is satisfactory as are many magnesium alloys such as those containing minor portions of other metals. In some cases, the magnesium may contain higher portions of metal such as zinc, cadmium, aluminum etc., which alone may with aluminum chloride also form active catalysts. A magnesium itself may be used as the source of magnesium for the reaction, for example, an excess magnesium chloride may be reacted with sodium, lithium, potassium, calcium, etc. to produce the magnesium in situ, which in turn will react with the aluminum chloride. The sodium, lithium, etc., may be used as an alloy such as sodium-potassium alloy, or an aluminum alloy or as a cesium alloy, etc.

Any ratio of magnesium to aluminum chloride may be used in the preparation of the activated aluminum halide catalysts of this invention, e.g., between $1Mg:100AlCl_3$ to $100Mg:1AlCl_3$. Satisfactory results are obtained in the ranges of $1Mg:5AlCl_3$ to $10Mg:1AlCl_3$. It has been found that the nature of the catalyst resulting from the ratio of magnesium to aluminum chloride determines, in part, the nature of the polymer obtained. If a large excess of aluminum chloride is used, or if the reaction between the magnesium and the aluminum chloride is terminated leaving large amounts of aluminum chloride in the mixture, low molecular weight polymers are obtained. In such cases, if desired, the excess aluminum chloride may be removed from the catalyst mixture by subliming the chloride by passing an inert gas such as helium, through the heated catalyst, or by selective controlled extraction with an aromatic hydrocarbon such as toluene.

The polymerization may be carried out in any convenient manner. The monomer, if liquid, may be added to the catalyst, or the solid catalyst may be added to the liquid monomer; or the solid catalyst may be slurried in an inert medium such as a hydrocarbon, a chlorinated hydrocarbon, aliphatic ethers, aromatic ethers, aliphatic aromatic ethers, cyclic ethers such as tetrahydrofuranes and the like. A gaseous monomer such as ethylene, is more conveniently polymerized by using an inert liquid medium. In all cases, a polymerization medium is preferred to dissipate the heat of the polymerization reaction and to facilitate the processing of the polymer.

As a polymerization medium, substantially any inert material can be used which is liquid under conditions of temperature and pressure employed and which has a dispersing action on the olefin polymerized. Hydrocarbon solvents are preferred, and are preferably free substantially of materials that react with the catalyst such as $O_2$, $H_2O$, alcohols, ketones and the like. Suitable solvents include pentane, hexane, cyclohexane, octane, benzene, chlorobenzene, xylene, toluene and the like. The aromatic hydrocarbons are the preferred solvents.

The amount of catalyst is not critical. Relatively small amounts are operable to form relatively large amounts of polymer. In general, a practical range is 0.001 to 0.1 mol activated aluminum halide per mol of olefin polymerized. Even larger amounts of catalyst are operable, but are uneconomical and increase the problems of purification of the polymer. The following examples are used by way of illustration and not of limitation of the invention.

*Example I*

One and four-tenths (1.4) grams of magnesium and 1.9 grams of aluminum chloride are ball-milled together under pure nitrogen for 120–140 hours in a conventional porcelain or stainless steel ball mill of 4 ounce capacity, which is about ½ full of ½ inch stainless steel or porcelain balls. The resulting catalyst is suspended in 80 ml. of toluene in a 200 ml. stainless steel rocking autoclave. The transfer from the mill to the autoclave is made in a dry box under a slight pressure of nitrogen to avoid contamination with moisture and oxygen. After the catalyst is transferred to the autoclave, the autoclave is sealed, and pressured with ethylene to 250–500 p.s.i. and heated to a temperature of 100–125° C. for about 12 hours. Ethylene is rapidly absorbed by the catalytic system in the autoclave and must be repressured from time to time to replace the ethylene consumed. After 12 hours, even though the system was still absorbing ethylene, the run was terminated, the autoclave cooled, vented, opened and the crude solid polyethylene transferred to a container containing about 200 ml. of methanol acidified with HCl and refluxed for 2 hours. The purified solid white polyethylene was then separated by filtration and dried. The yield is about 34 grams.

*Example II*

A catalyst is prepared by the procedure of Example I from 5.4 grams of Mg and 13 grams of $AlCl_3$ and used to polymerize ethylene as in Example I. The yield of solid polyethylene is about 26 grams and about 11 grams of oily polymer.

*Example III*

In accordance with the procedure of Example I a catalyst is prepared using 10 grams of magnesium and 3 grams of aluminum chloride in a steel ball mill heated to 150° C. and 4 grams of catalyst is transferred to an autoclave. The autoclave is connected to a source of propylene, sealed and heated to a reaction temperature of about 75° C. and pressured with propylene to 175 p.s.i. At the end of the reaction the pressure drops to 25–30 p.s.i., and the autoclave is cooled, vented and the reaction mixture transferred to a flask containing 200 ml. of methanol acidified with HCl and refluxed for 1 hour. The yield of filtered, dried and purified solid polypropylene is about 26 grams.

Substitution of the ethylene and propylene in the preceding examples by butene-1, pentene-1, hexene-1, styrene, para methyl styrene, vinylcyclohexene, butadiene, isoprene and like olefins containing generally a $CH_2\!=\!C\!<$ grouping or more specifically a $CH_2\!=\!CH\!-$ grouping, produces the corresponding polymers whereas mixtures of such olefins produce copolymers.

*Example IV*

Ten grams of the catalyst of Example III is dispersed in 100 ml. of purified hexane or cyclohexane in a three-neck flask equipped with stirrer, heating and cooling means as well as means for introducing gaseous or liquid monomers. Fifty grams of styrene in 100 ml. of hexane is then slowly added with continuous agitation over a period of 3 hours; the reaction being performed in an inert atmosphere of nitrogen. On completion of the addition of the styrene, the mixture is heated to 75° C. for 2 hours, after which the mixture is cooled and added to 1000 ml. of methanol containing HCl. On heating for 2 hours and then cooling, a fibrous solid, high molecular weight, high melting point polystyrene is isolated by filtration.

*Example V*

An electrically heated vertical furnace made of a quartz tube 10 inches long and ¾ inches I.D. wrapped with electrical resistance wire is filled with a mixture of Mg and $AlCl_3$ in a mol ratio of 5 to 1 (121.6 to 132 g.) and the gas in the tube replaced by helium to give an inert atmosphere. The furnace is then heated slowly to a temperature of about 300° C. for 12–24 hours. Any aluminum chloride that sublimes from the reaction mixture is returned to the reaction or may be replaced by new aluminum chloride by passing a heated inert gas such as helium or a noble gas through heated aluminum chloride and passing this gas through the tube. Alternately, the Mg and $AlCl_3$ may be sealed in the quartz tube and the sealed tube heated to effect reaction. The reaction product of the magnesium and $AlCl_3$ may be used directly, but preferably it is ball-milled as described in the procedure of Example I. Six grams of the ball milled catalyst of this example is dispersed in 100 ml. of toluene in a suitable reaction flask as previously described in Example III and ethylene gas slowly introduced into the flask. At the end of two hours at 90° C., 7 grams of solid polyethylene is isolated. When the experiment is repeated using 5 grams of the mixture of magnesium and $AlCl_3$, in the same ratio 5 to 1 directly, that is, they have not been ball milled or heat treated as described above, no solid polyethylene is obtained. Also no solid high molecular weight polyethylene is obtained when $AlCl_3$ is used alone to polymerize the ethylene. Similarly, no solid polymer is obtained when aluminum chloride is used in accordance with the procedure of German Patent 1,007,999.

The catalyst of this example is prepared more practically by milling the magnesium and the aluminum chloride for 6–36 hours in a stainless steel ball mill containing stainless steel balls and using an inert gas as a blanketing medium, with the ball mill heated electrically to temperatures in excess of 200° C. On completion of the reaction, the mill is cooled and dry benzene, toluene or hexane added to the mill to produce a catalyst slurry which is easily handled or transferred to polymerization apparatus.

*Example VI*

The catalysts of this invention are very reactive ionic catalysts and surprisingly very reactive reducing agents and therefore effective cocatalysts with other compounds of such metals as vanadium, chromium, niobium, titanium, zirconium, etc.

To 10 grams of $TiCl_4$ are added 100 ml. of dry purified toluene in a suitable reaction flask protected by an inert atmosphere of dry nitrogen. To this mixture is added 1.4 grams of magnesium and 1.9 grams of aluminum chloride at room temperature and no reaction is observed. When the catalyst of Example I which is the reaction product of magnesium and aluminum chloride used in the same ratio, is added to a similar solution, reduction of the $TiCl_4$ occurs as is observed by the formation of a brown or purple or black precipitate. Precipitates are also formed by the addition of the catalysts of Examples II, III, IV, and V. The addition of ethylene gas to such a mixture produces solid polyethylene at room temperature and at atmospheric pressure. Substitution of the titanium tetrachloride by the higher halides, especially the chlorides, of zirconium, cerium, niobium, vanadium, tantalum, chromium, molybdenum and tungsten results in active olefin polymerization catalysts capable of producing solid polymers from monoolefins and diolefins.

The catalysts of this invention may also be used as cocatalysts for the production of olefin polyers with compounds of titanium, zirconium, vanadium, cesium, niobium, tantalum, chromium, molybdenum and tungsten in a lower valency state, for example, titanium trichloride, titanium dichloride, zirconium trichloride, vanadium trichloride, molybdenum pentachloride, molybdenum tetrachloride, tantalum tetrachloride, tungsten tetrachloride, etc. When a cocatalyst is prepared from the solid magnesium-aluminum chloride reaction product and another reactant, it is preferred, if the reactant is a solid, such as titanium trichloride or zirconium tetrachloride, that the solids be mixed uniformly to effect reaction or complexing, such as by ball-milling dry or wet in an inert medium, or by refluxing in a solvent.

Instead of the chloride of the heavy metals listed above, the bromides, iodides, and many cases the fluorides may be used, as well as the alcoholates of the metal. The alcoholates may be described as having the formula $M(OR)_n$ and the halides as $MX_n$ where X is a halogen atom and R is a mono-valent hydrocarbon radical or substituted hydrocarbon radical, M is an element selected from at least one of the group consisting of Ti, Zr, Ce, V, Nb, Ta, Mo and W and $n$ is an integer corresponding to the valency of the metal in the compound used. For economic reasons, the halides are preferred.

*Example VII*

The procedure of Example I is repeated to produce copolymer of 50 ethylene and 50 propylene, 70 styrene and 30 butene-1, 90 hexene-1 and 10 butadiene, 30 butadiene and 70 chlorostyrene, 95 styrene and 5 pentadiene 1,3 and 75 styrene and 25 vinylcyclohexene.

*Example VIII*

To 50 ml. of benzene there is added 2 grams of the catalyst of Example V and 2 grams of titanium tetrachloride and the mixture refluxed for 2 hours under an inert atmosphere and then 50 ml. of benzene added. The solution is transferred to an autoclave and 50 grams of liquid isoprene added. The autoclave is sealed and heated to 50° C. for 6 hours after which it is cooled and the product added to 1 liter of methanol to precipitate the polymer. One gram of phenyl-β-nahthpyl amine is added to the polymer to protect it against oxidation. The polymer is then washed with water and dried. Twenty-five parts of this polymer are compounded with 1 part of zinc oxide, 1 part of stearic acid, 0.2 part of mercaptobenzothiazole and 0.75 part of sulfur and vulcanized at 275° C. for 30 minutes to produce a vulcanized product with properties similar to that of a vulcanized natural rubber.

*Example IX*

The procedure of Example VIII is repeated to produce copolymers of butadiene 95-isoprene 5 to butadiene 5-isoprene 95; isoprene 85-isobutylene 15; styrene 50-butadiene 25-isoprene 25; isoprene 90-cyclopentadiene-10.

*Example X*

Twenty-five parts of a commercial divinyl benzene containing approximately 50 percent of divinyl benzene and 50 percent of ethyl styrene are added slowly at 0° C. and with stirring to 100 parts of toluene containing 2 parts of the catalyst of Example I. The reaction is performed in a suitable reactor maintained in an inert atmosphere. Upon completion of the addition of the divinyl benzene mixture, the reaction is continued for five hours and then the temperature raised to 30° C. for 3 hours, after which it is added to a liter of HCl acidified methanol. The polymer is isolated by filtration, dried in a vacuum desiccator and stored under nitrogen. About 19 parts of polymer are obtained which contain unsaturation corresponding to a copolymer of the structure,

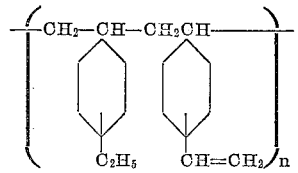

On heating to its melting point, the polymer converts, especially in the presence of air to an insoluble, infusible polymer. In the presence of catalyst, as for example, the per catalysts such as benzoyl peroxide, a catalytic conversion to the insoluble infusible state is obtained rapidly.

*Example XI*

The following example illustrates the use of the catalysts of this invention as an alkylating catalyst using an olefin as an alkylating agent.

Twenty-one and six-tenths grams of para cresol are dissolved in 100 parts of toluene and 4 grams of the catalyst of Example I are added to the mixture and the mixture heated to 50° C. With rapid stirring, 30 grams of isobutylene is slowly added to the mixture. Upon completion of the addition, the heating is continued for an additional hour, after which it is washed with dilute hydrochloric acid and the aqueous layer discarded. The solution is then washed with a 10% sodium carbonate solution and again washed with water. The mixture is then dried with anhydrous sodium sulfate and the toluene removed by distillation leaving a residue of 2,6-di(tertiary butyl) para cresol which on distillation under reduced pressure results in 35 grams of the pure product. The catalyst of this example is also useful as an isomerization catalyst.

The catalysts of this invention are useful in processes utilizing such olefins as the monoolefins, for example, ethylene, propylene, butene-1, butene-2, isobutylene, the various pentenes, isomeric hexenes, the isomeric heptenes, the various octenes, the various nonenes, the various decenes, etc., or mixed unsaturated petroleum distillates or fractions, cyclohexene, methyl cyclohexene, cycloheptene, styrene, α-methyl styrene, ortho-methyl styrene, meta-methyl styrene, para-methyl styrene, the dimethyl styrenes, the ethyl styrenes, vinyl naphthalene, vinyl diphenyl, vinyl carbazole, the diolefins and triolefins such as butadiene; isoprene; piperylene; 2,3-dimethyl-butadiene-1,3; 2-ethyl-butadiene-1,3; 4 methyl-pentadiene-1,3; methyl-pentadiene-1,3; hexadiene-2,4; hexatriene-1,3,5; 4 methyl hexadiene, allyl benzene, stilbene, indene, allene, diallyl, 1-vinyl cyclohexene-3, divinyl benzene, etc., or mixtures of such mono-, di- and triolefins.

The catalysts, as prepared in the practice of this invention, are useful in reacting and polymerizing olefins at temperatures ranging from about room temperature up to 200° C. or even higher and at pressures ranging from atmospheric or a few atmospheres to pressures as high as 10,000 p.s.i. or higher. For practical operation, however, temperatures in the range of 20–200° C. and pressures of 50–1000 p.s.i. are suitable.

The polyolefins obtained by the practice of this invention can be used in any conventional manner now being used by the polyolefins formed by the prior art procedures. Such uses include film, moldings, pipes, tire, tubing, fibers, filament, extruded articles, laminated products and the like.

I claim:

1. The process of polymerizing an olefin at a temperature in the range of about 20–200° C. and at a pressure of at least atmospheric pressure and no more than about 10,000 p.s.i. with a catalyst consisting essentially of the preformed reaction product of a mixture consisting of magnesium and an aluminum halide, the reaction of said mixture being conducted under otherwise inert conditions, and said magnesium being reacted in a proportion of 0.01–100 parts by weight per part by weight of aluminum halide.

2. The process of polymerizing an olefin at a temperature in the range of about 20–200° C. and at a pressure of at least atmospheric pressure and no more than about 10,000 p.s.i. with a catalyst consisting essentially of the preformed reaction product of a mixture consisting of magnesium and aluminum chloride, the reaction of said mixture being conducted under otherwise inert conditions, said mixture containing 0.01–100 parts by weight of magnesium per part by weight of aluminum chloride.

3. The method of polymerizing an olefin at a temperature in the range of about 20–200° C. and at a pressure of at least atmospheric pressure and no more than about 10,000 p.s.i. in an inert solvent with a catalyst consisting essentially of the preformed reaction product of a mixture consisting of magnesium and aluminum chloride, the reaction of said mixture being conducted under otherwise inert conditions, said mixture containing 0.01–100 parts by weight of magnesium per part by weight of aluminum chloride.

4. The method of polymerizing a monoolefin at a temperature in the range of about 20–200° C. and at a pressure of at least atmospheric pressure and no more than about 10,000 p.s.i. which comprises heating the olefin in an inert solvent with a catalyst consisting essentially of the preformed reaction product prepared by reacting under inert conditions a mixture consisting of magnesium and aluminum chloride, said mixture containing 0.01–100 parts by weight of magnesium per part by weight of aluminum chloride.

5. The method of polymerizing a diolefin at a temperature in the range of about 20–200° C. and at a pressure of at least atmospheric pressure and no more than about 10,000 p.s.i. which comprises heating the olefin in an inert solvent with a catalyst consisting essentially of the preformed reaction product prepared by reacting under inert conditions a mixture consisting of magnesium and aluminum chloride, said mixture containing 0.01–100 parts by weight of magnesium per part by weight of aluminum chloride.

6. The method of polymerizing ethylene at a temperature in the range of about 20–200° C. and at a pressure of at least atmospheric pressure and no more than about 10,000 p.s.i. which comprises heating the ethylene in an inert solvent with a catalyst consisting essentially of the preformed reaction product prepared by reacting under inert conditions a mixture consisting of magnesium and aluminum chloride, said mixture containing 0.01–100 parts by weight of magnesium per part by weight of aluminum chloride.

7. The method of polymerizing propylene at a temperature in the range of about 20–200° C. and at a pressure of at least atmospheric pressure and no more than about 10,000 p.s.i. which comprises heating the propylene in an inert solvent with a catalyst consisting essentially of the preformed reaction product prepared by reacting under inert conditions a mixture consisting of magnesium and aluminum chloride, said mixture containing 0.01–100 parts by weight of magnesium per part by weight of aluminum chloride.

8. The method of polymerizing styrene at a temperature in the range of about 20–200° C. and at a pressure of at least atmospheric pressure and no more than about 10,000 p.s.i which comprises heating the styrene in an inert solvent with a catalyst consisting essentially of the preformed reaction product prepared by reacting under inert conditions a mixture consisting of magnesium and aluminum chloride, said mixture containing 0.01–100 parts by weight of magnesium per part by weight of aluminum chloride.

9. The method of polymerizing a butadiene at a temperature in the range of about 20–200° C. and at a pressure of at least atmospheric pressure and no more than about 10,000 p.s.i. which comprises heating the butadiene in an inert solvent with a catalyst consisting essentially of the preformed reaction product prepared by reacting under inert conditions a mixture consisting of magnesium and aluminum chloride, said mixture containing 0.01–100 parts by weight of magnesium per part by weight of aluminum chloride.

10. The method of polymerizing 2-methyl-butadiene-1,3 at a temperature in the range of about 20–200° C. and at a pressure of at least atmospheric pressure and no more than about 10,000 p.s.i. which comprises heating 2-methyl-butadiene-1,3 in an inert solvent with a catalyst comprising the preformed reaction product prepared by reacting under inert conditions a mixture consisting of magnesium and aluminum chloride, said mixture containing 0.01–100 parts by weight of magnesium per part by weight of aluminum chloride.

11. The method of producing a polyolefin that comprises polymerizing the olefin at a temperature in the range of about 20–200° C. and at a pressure of at least atmospheric pressure and no more than about 10,000 p.s.i. in an inert solvent with a catalyst consisting essentially of (1) the preformed reaction product of a mixture consisting of magnesium and an aluminum halide complexed with (2) at least one compound selected from the class consisting of the halides and alkoxy compounds of titanium, zirconium, cerium, vanadium, niobium, tantalum, chromium, molybdenum, tungsten, cobalt and nickel, the reaction of said mixture being conducted under otherwise inert conditions, said mixture containing 0.01–100 parts by weight of magnesium per part by weight of aluminum halide, and said complexed catalyst containing 1–3 parts by weight of said compound per part by weight of said reaction product.

12. The method of producing a polyolefin which comprises polymerizing the olefin at a temperature in the range of about 20–200° C. and at a pressure of at least atmospheric pressure and no more than about 10,000 p.s.i. in an inert solvent with a catalyst consisting essentially of (1) the preformed reaction product of a mixture consisting of magnesium and aluminum chloride and (2) at least one halide of an element of the group consisting of titanium, zirconium, cerium, vanadium, niobium, tantalum, chromium, molybdenum, tungsten, cobalt and nickel, the reaction of said mixture being conducted under otherwise inert conditions, said reaction mixture containing 0.01–100 parts by weight of magnesium per part by weight of aluminum chloride, and said halide-preformed reaction product mixture containing 1–3 parts by weight of said halide per part by weight of said preformed reaction product.

13. The process of claim 12 in which the olefin is ethylene.

14. The process of claim 12 in which the olefin is propylene.

15. The process of claim 12 in which the olefin is styrene.

16. The process of claim 12 in which the olefin is a butadiene.

17. The process of claim 12 in which the olefin is isoprene.

18. The process of claim 12 in which the magnesium and aluminum chloride are heated and ball-milled.

19. The method of claim 12, in which said halide is a zirconium chloride.

20. The method of claim 12, in which said halide is a vanadium chloride.

21. The method of claim 12, in which said halide is a molybdenum chloride.

22. The method of claim 12, in which said halide is titanium tetrachloride.

23. The method of claim 12, in which said halide is titanium trichloride.

24. The method of claim 12, in which said halide is titanium dichloride.

25. The process of polymerizing an olefin at a temperature in the range of about 20–200° C. and at a pressure of at least atmospheric pressure and no more than about 10,000 p.s.i. with a catalyst comprising the reaction product of a mixture consisting of magnesium and an aluminum halide, the reaction of said mixture being conducted under otherwise inert conditions.

26. The process of polymerizing ethylene at a temperature in the range of about 20–200° C. and at a pressure of at least atmospheric pressure and no more than about 10,000 p.s.i. which comprises heating ethylene in an inert solvent containing a catalyst comprising the reaction product prepared by reacting under inert conditions a mixture consisting of magnesium and aluminum chloride.

27. The process of preparing a polyolefin at a temperature in the range of about 20–200° C. and at a pressure of at least atmospheric pressure and no more than about 10,000 p.s.i. which comprises polymerizing an olefin in a mixture consisting of (1) an inert solvent, (2) the reaction product of a mixture consisting of magnesium and aluminum chloride, the reaction of said mixture being conducted under otherwise inert conditions, and (3) at least one halide of an element of the group consisting of titanium, zirconium, cerium, vanadium, niobium, tantalum, chromium, molybdenum, tungsten, cobalt, and nickel.

28. The process of claim 27 in which said olefin is ethylene.

References Cited in the file of this patent

UNITED STATES PATENTS

| | | |
|---|---|---|
| 2,082,500 | Kuentzel | June 1, 1937 |
| 2,878,240 | Schmerling | Mar. 17, 1959 |
| 2,935,498 | Hagemeyer et al. | May 3, 1960 |